United States Patent
McLarnon et al.

(10) Patent No.: US 9,350,747 B2
(45) Date of Patent: May 24, 2016

(54) METHODS AND SYSTEMS FOR MALWARE ANALYSIS

(71) Applicant: Cyberpoint International LLC, Baltimore, MD (US)

(72) Inventors: Mark McLarnon, Baltimore, MD (US); Mark V. Raugas, Baltimore, MD (US); Ryan Fisher, Omaha, NE (US); Nate Rogers, Baltimore, MD (US); Mike Kolodny, Gambrills, MD (US)

(73) Assignee: CyberPoint International LLC, Baltimore, MD (US)

( * ) Notice: Subject to any disclaimer, the term of this patent is extended or adjusted under 35 U.S.C. 154(b) by 194 days.

(21) Appl. No.: 14/068,605

(22) Filed: Oct. 31, 2013

(65) Prior Publication Data

US 2015/0121526 A1 Apr. 30, 2015

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *G06F 21/56* | (2013.01) |

(52) U.S. Cl.
CPC ............... *H04L 63/14* (2013.01); *G06F 21/56* (2013.01)

(58) Field of Classification Search
CPC ...... G06F 21/56; G06F 21/561; G06F 21/568; H04L 63/14; H04L 63/1441; H04L 63/145
See application file for complete search history.

(56) References Cited

U.S. PATENT DOCUMENTS

| | | | |
|---|---|---|---|
| 8,800,044 B2 | 8/2014 | Raad | |
| 2009/0064323 A1* | 3/2009 | Lin | ................................. 726/22 |
| 2012/0330801 A1* | 12/2012 | McDougal | ............ G06F 21/577 |
| | | | 705/32 |
| 2013/0019310 A1* | 1/2013 | Ben-Itzhak | ............. G06F 21/52 |
| | | | 726/23 |
| 2013/0139260 A1 | 5/2013 | McDougal | |
| 2015/0096022 A1* | 4/2015 | Vincent | ................. G06F 21/566 |
| | | | 726/23 |

FOREIGN PATENT DOCUMENTS

| | | |
|---|---|---|
| EP | 2000964 A1 | 10/2008 |
| EP | 2447876 A3 | 10/2013 |
| WO | WO2011127488 A3 | 10/2011 |

OTHER PUBLICATIONS

Notification of Transmittal of the International Search Report and the Written Opinion of the International Searching Authority or the Declaration issued in PCT/US2014/063482 on Jan. 28, 2015.

* cited by examiner

*Primary Examiner* — Shewaye Gelagay
*Assistant Examiner* — Trong Nguyen
(74) *Attorney, Agent, or Firm* — Fish & Richardson P.C.

(57) ABSTRACT

Methods, system, and media for analyzing a potential malware sample are disclosed. A sample for malware analysis may be received. The sample may be received through a web interface. The sample may be analyzed using a plurality of analyzers implemented on one or more computing devices. The analyzers may perform a sequence of configurable analytic steps to extract information about the sample. The extracted information may be displayed to a user through the web interface.

36 Claims, 10 Drawing Sheets

Example Rule

Rule name: FINDING_LOADS_NT_QUERY_INTERVAL_PROFILE

Sample Rule:

```
rule "Loads NtQueryIntervalProfile"
    when
        $process : RunningProcess(
callsWindowsFunctionWithArgument("LdrGetProcedureAddress", new
Argument("FunctionName", "NtQueryIntervalProfile")))
    then
        List<FunctionCall> list =
$process.getAllWindowsCallsTo("LdrGetProcedureAddress", new
Argument("FunctionName", "NtQueryIntervalProfile"));

Finding f = new
Finding("FINDING_LOADS_NT_QUERY_INTERVAL_PROFILE", Finding.HIGH_CONFIDENCE,
Risk.LOW);

f.addEvidenceList(list);
        sessionHelper.insertOrUpdate(f, 0);
end
```

Finding: NtQueryIntervalProfile API is an undocumented Windows API function used to set delays in system performance. Malware often abuses it to trigger to privilege escalation attacks.

Figure 5-2

Analytic Summary

What is it?

- This target has been classified as a potential information gathering program. This means it has the ability to gather information about your system that could be used to craft future malware for delivery or exploitation or accurately identify files or settings that if lost could cause professional, social or even financial harm. (40%)
- This target is making a deliberate attempt to determine if it is running within a virtual machine (VM) environment. This is normally accompanied by a deliberate exit attempt of some type either subtle or explicit. (10%)
- This target appears to be taking steps to determine if it is in a sandbox environment. This is not normal behaviour and typically leads to alternate paths of execution or halt of execution. (10%)

What did we see?

- The target was observed exiting in an error state. In a normal situation this means the original software designer felt that something was wrong so the program should cease execution. (70%)
- The target was observed installing a function hook for all desktop programs to interrupt all graphical actions (e.g. mouse clicks, menu options, new windows, etc.). (70%)
- The target is using function calls in a non-standard fashion. While there may be an explanation for this unfortunately these calls can be used to accomplish actions which are malicious. (70%)
- The target was observed making a function call to check and see if a software debugger was attached. Malware will frequently do this to determine if it is being debugged and thus being monitored. (99%)

What can it do?

- The target was observed attempting to connect to the service control manager (SCM) system of Windows. This part of the operating system is designed to control how services are installed, removed and started or stopped. By itself this connection attempt is not harmless. (70%)

METHODS AND SYSTEMS FOR MALWARE ANALYSIS

FIELD

This disclosure relates generally to malware analysis, and more particularly to methods, system, and media for malware analysis.

BACKGROUND

Existing malware analysis services suffer from several deficiencies. First, some of these services, although competent for some malware threats, are not enough to combat a malware infection. One cannot just rely on a sandbox to determine what a piece of malware has done. Second, several previous attempts are built to target only a single type of malware or platform, e.g. Microsoft® Windows®. Yet, malware is often platform agnostic, and can target multiple platforms. Third, some of these services do not produce output understandable to anyone beyond those with specialized training, e.g. a degree in Computer Science. This limits the usefulness of these services to users that do not possess the specialized training.

What is needed is a design such that as malware threats change and evolve, the analysis conducted by the various processing elements can change and evolve as well.

SUMMARY

Various embodiments are generally directed to malware analysis to overcome the aforementioned problems.

One or more embodiments may include a method for analyzing a potential malware sample, the method comprising: receiving a sample for malware analysis through a web interface; analyzing the sample using a plurality of analyzers implemented on one or more computing devices, wherein the analyzers perform a sequence of configurable analytic steps to extract information about the sample; and displaying the extracted information to a user through the web interface.

One or more embodiments may include a system comprising: a memory; and a processor coupled to the memory, the processor being configured to: receive a sample for malware analysis through a web interface; analyze the sample using a plurality of analyzers implemented on one or more computing devices, wherein the analyzers perform a sequence of configurable analytic steps to extract information about the sample; and display the extracted information to a user through the web interface.

One or more embodiments may include a computer readable storage medium comprising instructions that if executed enables a computing system to: receive a sample for malware analysis through a web interface; analyze the sample using a plurality of analyzers implemented on one or more computing devices, wherein the analyzers perform a sequence of configurable analytic steps to extract information about the sample; and display the extracted information to a user through the web interface.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which:

FIG. 5-1 depicts a block diagram of an exemplary system in accordance with one or more embodiments.

FIG. 5-2 depicts an example of custom rules in accordance with one or more embodiments.

FIG. 5-3 depicts an exemplary analytic summary in accordance with one or more embodiments.

FIG. 6 depicts an exemplary interface in accordance with one or more embodiments.

DETAILED DESCRIPTION OF THE DRAWINGS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

A system, method, medium, or computer-based product may provide tools to assist analysts and computer incident responders when analyzing malware. The system, method, medium, or product may be designed to reduce the amount of effort required to analyze and reverse engineer malware. It may help to identify the malware, what the malware did to a system, what the malware could have done, how one knows if the malware ran on one or more systems, and how one removes the malware from a system. The system, method, medium, or product may combine an expandable set of machine learning algorithms and rule sets for automated analysis, adaptors for external analytics, a workflow management framework for processing and reporting, and a web-based user interface.

The system, method, medium, or product can substantially increase the work productivity of malware analysts and computer incident responders. The system, method, medium, or product may provide user, e.g. novice and intermediate level security experts, with the tools to perform at expert levels and with much greater efficiency. The system, method, medium, or product can be deployed as a stand-alone tool or can be integrated into an existing automated workflow.

Figure 1:
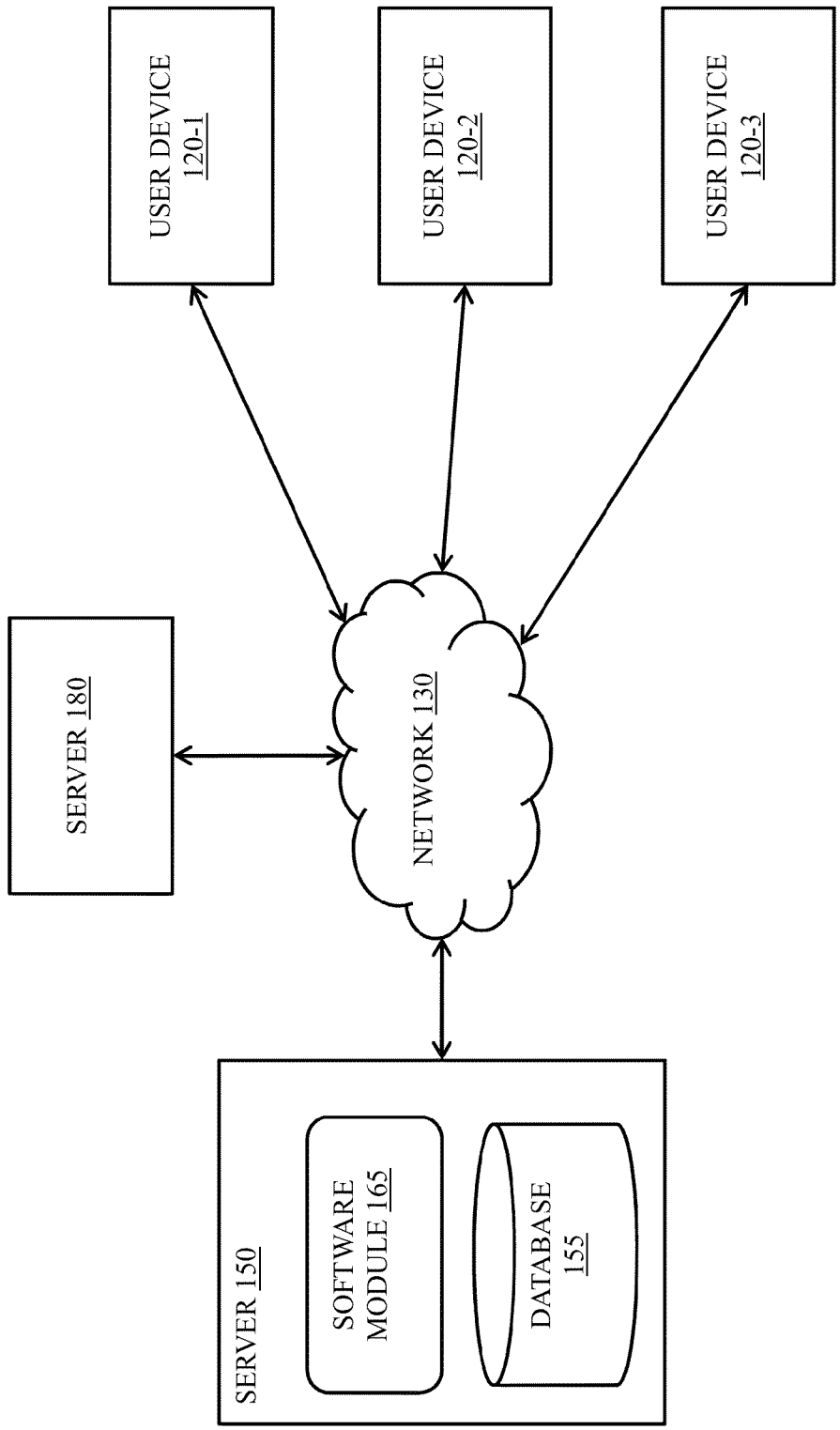
FIG. 1 depicts a block diagram of an exemplary system in accordance with one or more embodiments.

FIG. 1 depicts a block diagram of an exemplary system 100 in accordance with one or more embodiments. System 100 may include one or more user devices, e.g. user device 120-1, user device 120-2, and user device 120-3, network 130, server 150, database 155, software module 165, and server 180.

The one or more user devices, e.g. user device 120-1, user device 120-2, and user device 120-3 may any type of computing device, including a mobile telephone, a laptop, tablet, or desktop computer, a netbook, a video game device, a smart phone, an ultra-mobile personal computer (UMPC), etc. The one or more user devices may run one or more applications, such as Internet browsers, voice calls, video games, video-conferencing, and email, among others. The one or more user devices may be any combination of computing devices. These devices may be coupled to network 130.

Network 130 may provide network access, data transport and other services to the devices coupled to it. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also comprise, for instance, a local area network (LAN), a wide area network (WAN), the Internet, a virtual LAN (VLAN), an enterprise LAN, a layer 3 virtual private network (VPN), an enterprise IP network, or any combination thereof.

Server 150 or server 180 may also be any type of computing device coupled to network 130, including but not limited to a personal computer, a server computer, a series of server computers, a mini computer, and a mainframe computer, or combinations thereof. Server 150 or server 180 may be a web server (or a series of servers) running a network operating system, examples of which may include but are not limited to Microsoft Windows Server, Novell NetWare, or Linux. Server 150 or server 180 may be used for and/or provide cloud and/or network computing. Although not shown in FIG. 1, server 150 and or server 180 may have connections to external systems like email, SMS messaging, text messaging, ad content providers, etc. Any of the features of server 150 may be also implemented in server 180 and vice versa.

Database 155 may be any type of database, including a database managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Software module 165 may be a module that is configured to send, process, and receive information at server 150. Software module 165 may provide another mechanism for sending and receiving data at server 150 besides handling requests through web server functionalities. Software module 165 may send and receive information using any technique for sending and receiving information between processes or devices including but not limited to using a scripting language, a remote procedure call, an email, a tweet, an application programming interface, Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

Although software module 165 may be described in relation to server 150, software module 165 may reside on any other device. Further, the functionality of software module 165 may be duplicated on, distributed across, and/or performed by one or more other devices, either in whole or in part.

Figure 2:
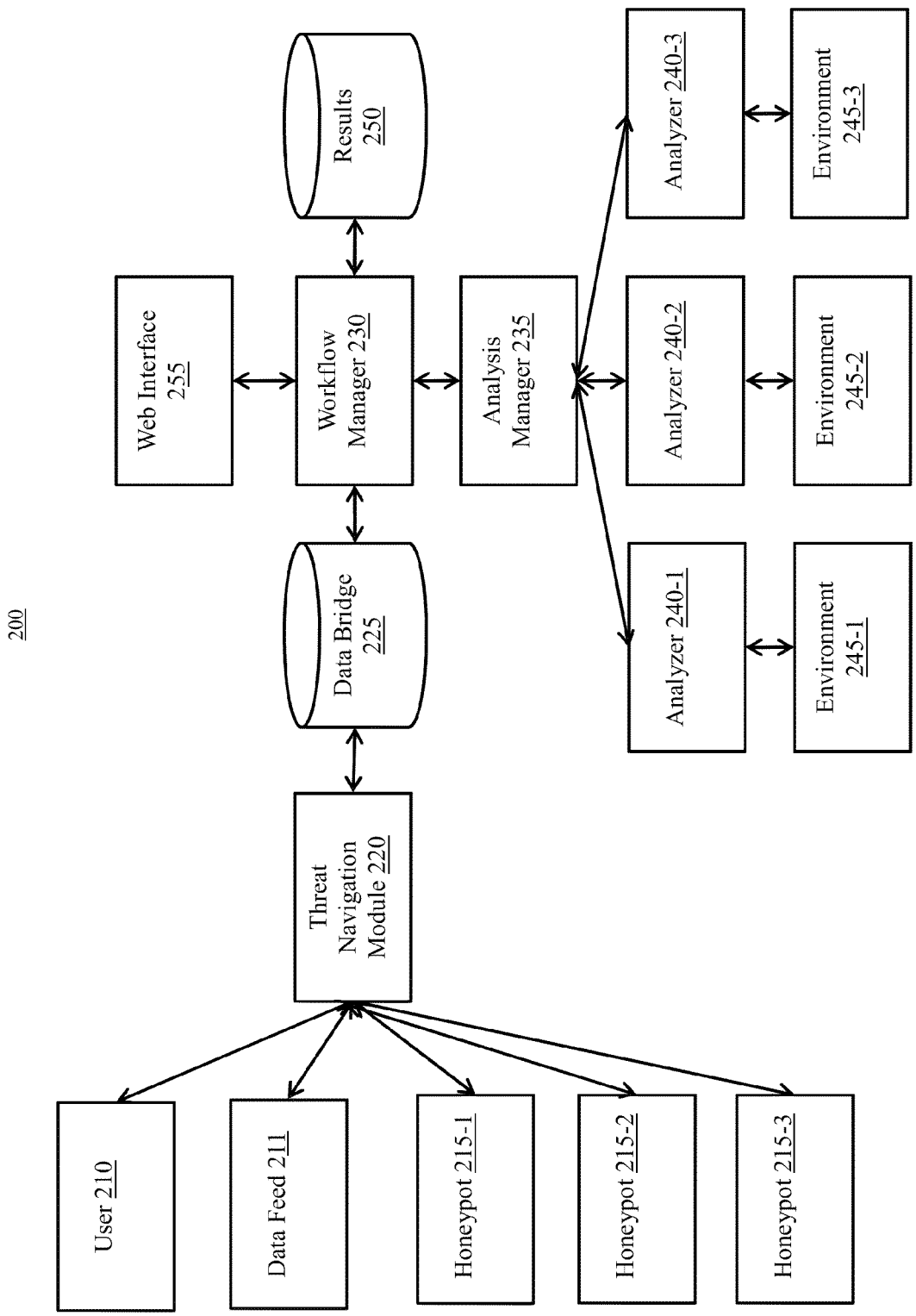
FIG. 2 depicts a block diagram of an exemplary system in accordance with one or more embodiments.

FIG. 2 depicts a block diagram of an exemplary system 200 in accordance with one or more embodiments. System 200 may provide a workflow management system for the automated, collaborative analysis, and/or reverse engineering of malware. System 200 may combine an expandable set of machine learning algorithms and rule sets for automated analysis, adaptors for external analytics, a workflow management framework for processing and reporting, and a web-based user interface. System 200 may be implemented on system 100. For example, the software modules may be implemented by software module 165, and any information may be stored in database 155.

A user 210 may utilize system 200. System 200 may include one or more honeypots, e.g., honeypot 215-1, honeypot 215-2, and honeypot 215-3, threat navigation module 220, data bridge 225, workflow manager 230, analysis manager 235, one or more analyzers, e.g. 240-1, 240-2, and 240-3, one or more environments, e.g. 245-1, 245-2, and 245-3, results 250, and web interface 255.

Figure 3:
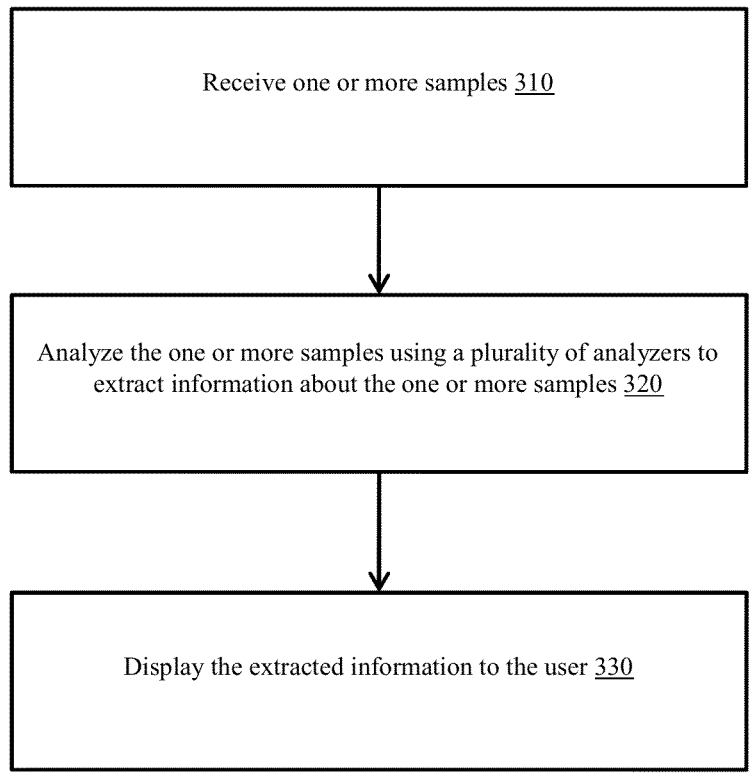
FIG. 3 depicts a block flow diagram of an exemplary method in accordance with one or more embodiments.

FIG. 3 depicts a block flow diagram of an exemplary method 300 in accordance with one or more embodiments. Although exemplary method 300 will be discussed in conjunction with system 200, exemplary method 300 is not limited to execution on system 200, and may be implemented by any system capable of performing or being configured to perform exemplary method 300.

In block 310, a sample for malware analysis may be received. User 210, one or more honeypots, or any combination thereof, may submit one or more samples, e.g. files, binary files, etc., to initiate malware analysis. Samples may also be received via a data feed 211. In some instances, samples may be automatically collected and submitted via data feed 211. The samples may be submitted via a web interface. The one or more honeypots, e.g., honeypot 215-1, honeypot 215-2, and honeypot 215-3, may refer to a trap set to detect, deflect, or in some manner counteract attempts at unauthorized use of information systems. User 210 may be any user of system 200.

Threat navigation module 220 may receive one or more samples, which may initiate a series of automated, configurable analytic steps, which may include application of machine learning models for signature-free assessment of threat severity, as well as external static and dynamic analytics, including file hashing, comparison against public or private whitelists/blacklists, and storage of ingested files and their resulting metadata, or any combination thereof. The threat navigation module 220 may be responsible for preprocessing the sample before entry into the data bridge 225. Results of the preprocessing step may assist the system in determining initial workflows. Examples of preprocessing are: uncompressing a sample, decrypting a sample, and identifying the file type. Attributes such as the file type may affect the workflow by determining the analyzers that are applicable to the sample. Thus, the analyzers used in a workflow may be assigned based on the results of the preprocessing.

The files may be forwarded to a data bridge 225 for storage in a sample repository. Data bridge 225 and/or the sample repository may be implemented by database 165. Samples captured by honeypots may be presented to a threat navigation module 220 and forwarded to the data bridge 225 for storage.

Workflow manager 230 may leverage high availability and fault tolerant computer technologies to scale in processing power as the user base expands. Workflow manager 230 can easily integrate new analyzers while giving users the ability to not only schedule new workflows but also stop existing workflows from the administrative interface of the system. This is all done without having to shut down or redeploy the system 200.

Figure 4:
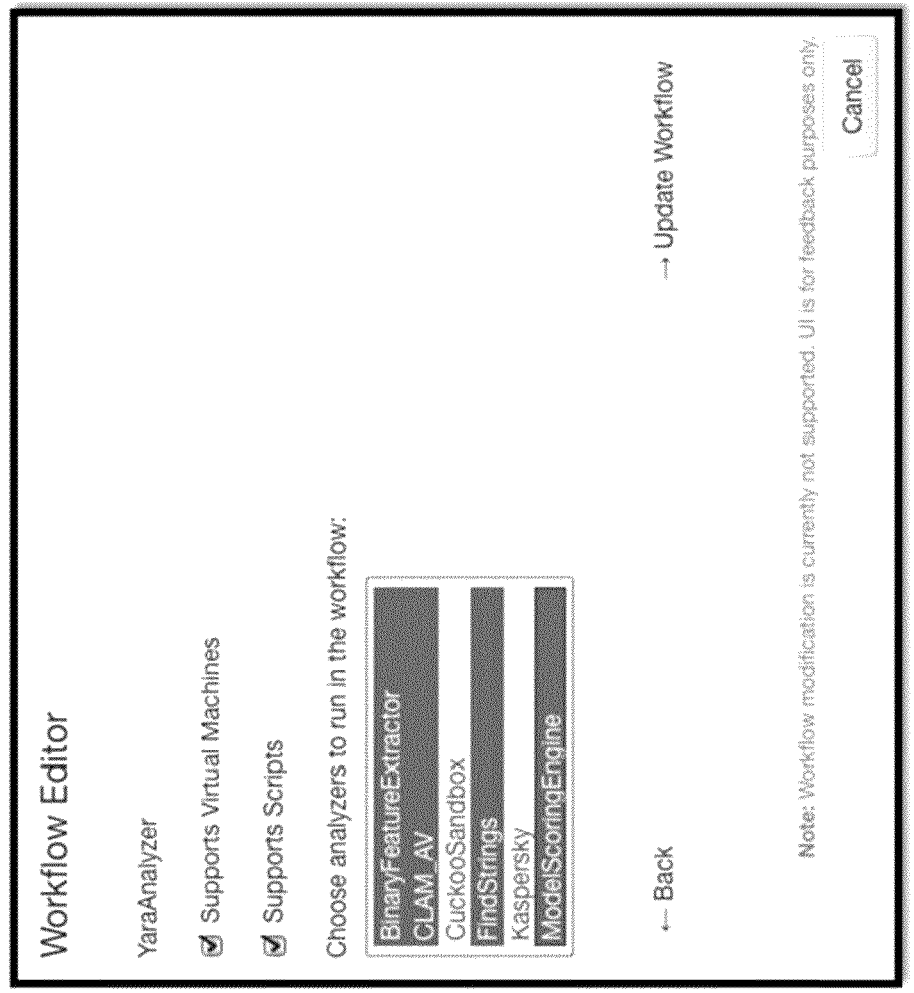
FIG. 4 depicts an exemplary workflow editor in accordance with one or more embodiments.

Users may be able to create and/or modify existing workflows by invoking a workflow editor and selecting the desired analyzers. FIG. 4 depicts an exemplary workflow editor 400 in accordance with one or more embodiments. Workflow editor may be presented to a user (e.g. user 210) on a user device (e.g. one or more of user devices 120-1, 120-2, or 120-3). Workflow editor 400 may be presented as a web page, by an application, or any combination thereof. Using workflow editor 400, a user may select one or more analyzers to run in the workflow. For example, in FIG. 4, the BinaryFeatureExtractor, CLAM_AV, FindStrings, and ModelScoringEngine analyzers have been selected. Any analyzer may be listed and/or selected by the user. A user may also specify an order in which to apply the selected analyzers, e.g. by using workflow editor 400. A user may also specify one or more workflow options. For example, a user may specify whether or not a workflow will support and/or use virtual machines, whether or not a workflow will support scripts, or any other user selectable option associated with a workflow.

Referring back to FIG. 3, in block 320, once the samples are stored, workflow manager 230 may invoke an analysis manager 235, which may invoke one or more analyzers, e.g. 240-1, 240-2, and 240-3, that perform a sequence of configured analytic steps to extract information about the sample. The analysis manager 235 may be pre-configured to follow a specific sequence created by default or a sequence generated by the user. In some embodiments, analysis manager 235 may have control only of one or more data analyzers, whereas the workflow manager 230 may have a wider influence on the sequence of system actions.

An analyzer, e.g. analyzers 240-1, 240-2, and 240-3, may refer to a discrete program, script, or environment designed to process a piece of malware in some manner to extract some useful piece of information within or metadata about the malware. The analyzer may be provided with a complete API of functions for storage, extraction, processing and reporting on malware. An API, such as a RESTful interface, may be used to make the extracted information available to other computing devices and to upload the file of potential malware. An analyzer may be implemented in any programming language, e.g. in Python and Java implementations, and may be developed for implementation on any operating system, e.g. Linux, OS X, Windows, etc. However, the analyzers, regardless of implementation, may all integrate with the application programming interface.

The system may be capable of recursive analysis, in which each analytical outcome could reveal more information to invoke more analyzers. For example, a first analyzer may be run and produce a first analytical outcome as a result of the execution. The first analyzer may run a second analyzer, e.g. another analyzer different from the first analyzer or even the same first analyzer, to process the first analytical outcome. The first analyzer may call the second analyzer before or after completing its own analysis. The first analyzer may use the results of the run of the second analyzer when performing its analysis.

The analyzers performing a sequence of configured analytic steps may include forwarding the sample to one or more environments, e.g. 245-1, 2-45-2, and 245-3, for execution and behavioral profiling. The one or more environments may include a sandbox environment for execution and behavior profiling. The one or more environments may include hardware configurations, to which samples may be sent for processing.

Instructions to and results from the analyzers may be passed via a heterogeneous set of messaging mechanisms.

Figures 1, 5:
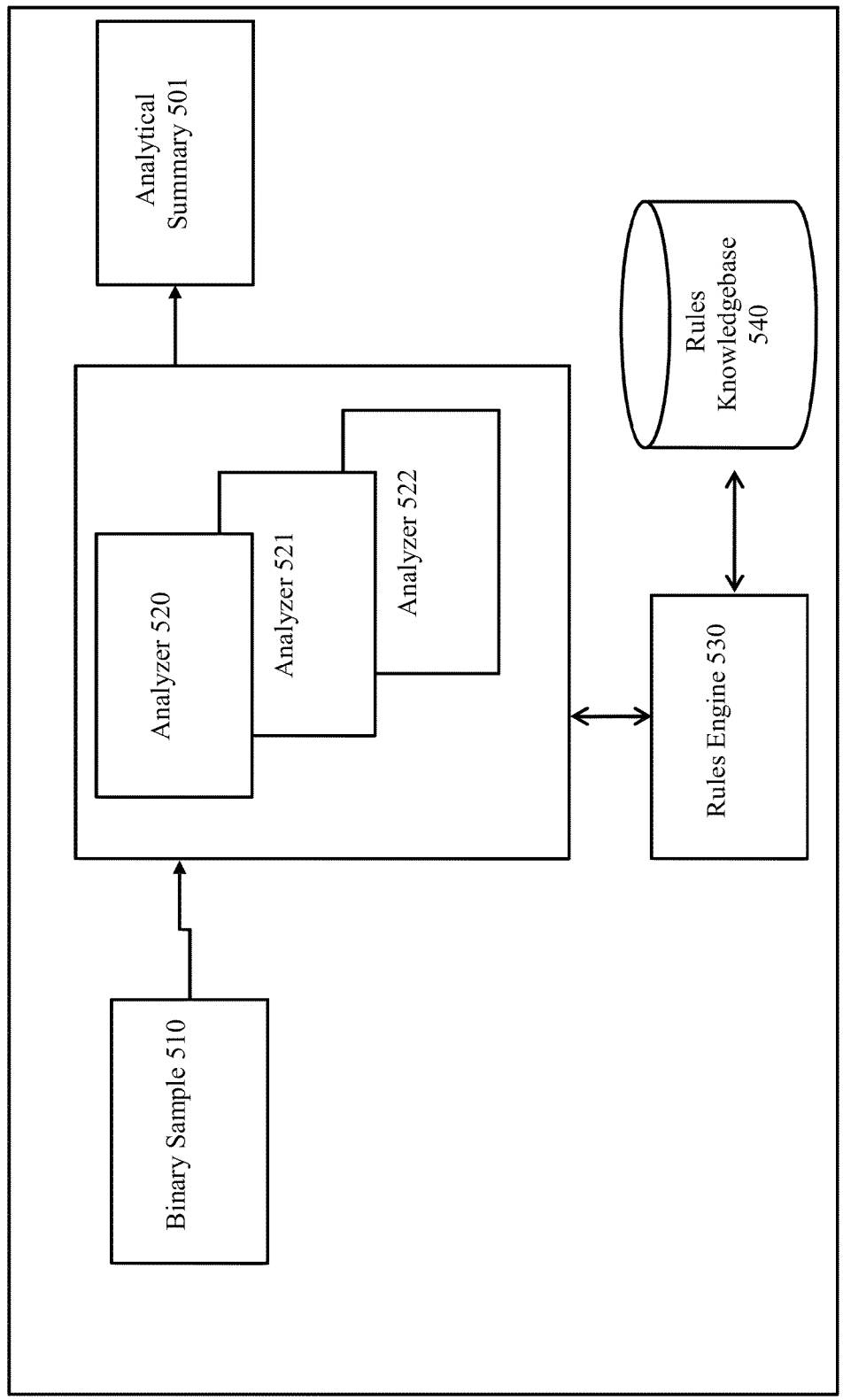

FIG. 5-1 depicts one or more analyzers 520, 521, and 522 processing binary sample 510 (suspected malware) and interrogating the rule knowledgebase 540 (via the rules engine 530) to extract knowledge to produce classification, observations, and conclusions that are presented to the user as an analytic summary 501. The analytic summary 501 may be a conversion of technical data into actionable data points that can be consumed by users of the system, e.g. novice users of the system. The rule knowledgebase may be updated as new rules are developed. FIG. 5-2 depicts an example of a rule.

FIG. 5-3 depicts an exemplary analytic summary 501 in accordance with one or more embodiments. Analytic summary 501 may include several examples of the actionable data or one or more analyzed samples. For example, analytic summary 501 includes the actionable data "The target was observed installing a function hook for all desktop programs to interrupt all graphical actions (e.g. mouse clicks, menu options, new windows, etc.). (70%)." From this actionable data, a user may gain an understanding of the behavior of the sample, and determine whether or not to pursue further action, e.g. removing the malware, alerting someone about the malware, etc. Actionable data may include a percentage which indicates the system's confidence level.

One or more analyzers may leverage machine learning technology to automatically classify each submitted sample and attempt to determine if the sample is malware or not without requiring any antivirus signatures.

Referring back to FIG. 3, results from the analyzers may be stored, and, once analysis is complete, the results may be presented at the user interface as a report. In block 330, results of the analysis 250 may be displayed to the user in the web interface 255. The results may be information extracted about the sample during the analysis. As shown in FIG. 5-3, the results may be a clear, concise and simple explanation about the malware submitted, and may include everything from complex classification to basic, to high-level conclusions ("What is it?"), and even suggestions for further proof or remediation of the target or any combination thereof. The output may be designed to be user friendly to anyone from a newly hired junior system administrator to an executive level user responsible for thousands of machines. As discussed above, FIG. 5-3 depicts an exemplary analytic summary 501. Analytic summary 501 may be an example of the report displayed at the user interface.

Via the web interface 255, results may be annotated and shared, and additional analytics may be requested. Users may retrieve via the web interface 255 the results of prior analyses, and current and prior analyses may be annotated and shared. For example, a user may provide an annotation of extracted information through web interface 255 that provides an identification or steps for remediation the sample. The annotation may be transmitted to one or more other users, so that the other users can even more easily identify and/or remediate the sample.

Figure 6:
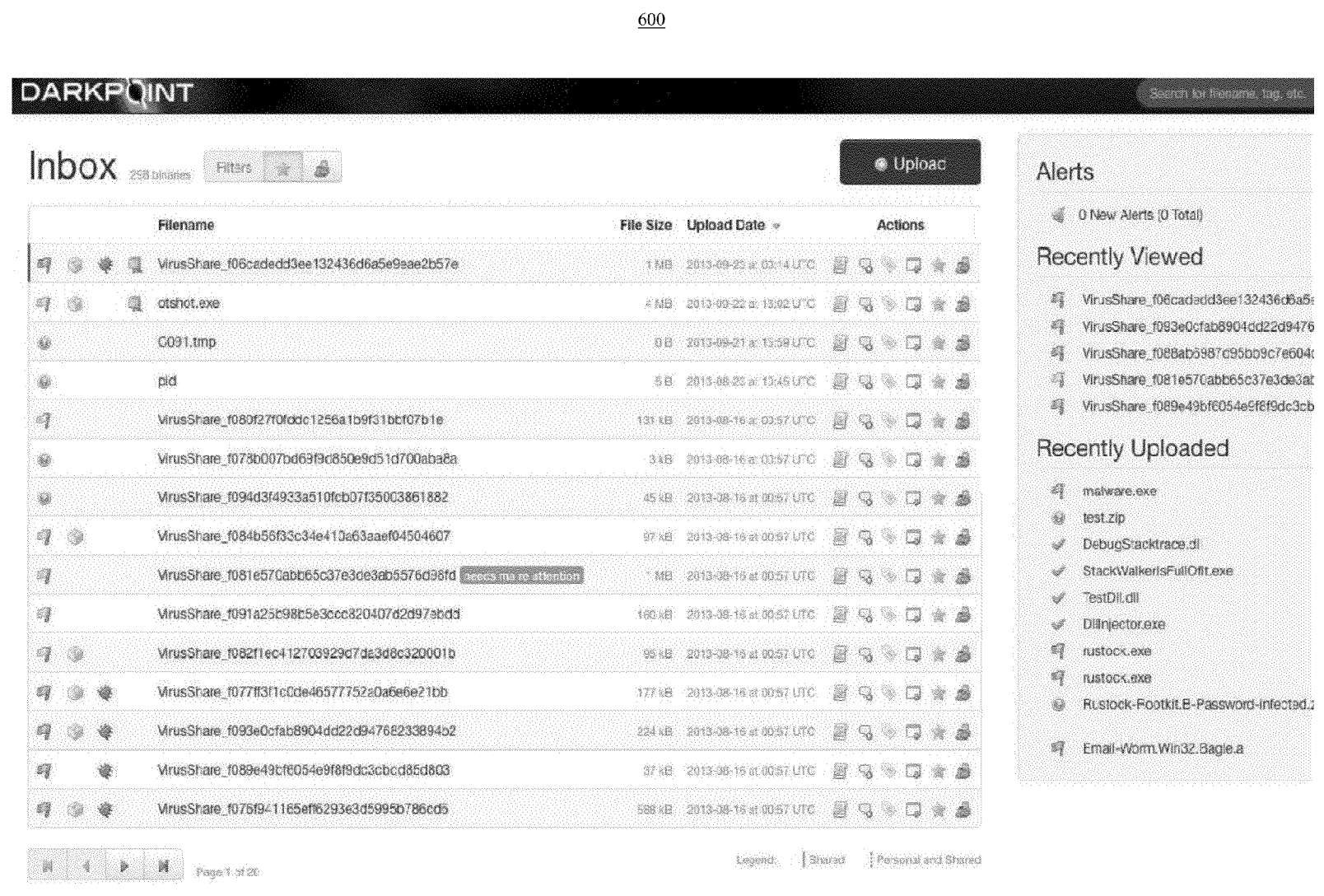

FIG. 6 depicts an exemplary interface 600 in accordance with one or more embodiments. Interface 600 may be presented via the web interface 255.

Alerts may inform users when the results of new analyses are available. For example, a user may be identified as having been interested in a particular instance, type, or class of malware. Whenever a new analysis of a sample is performed, and that sample matches the particular instance, type, or class of interested, system 200 may transmit an alert to the user when the new analysis is available. The alert may include the timestamp for the identification, filename of the triggering malware, SHA1 or other unique hash for the binary, and name of the alert that was triggered. A URL may also be provided to view any meta-data or report information generated for the binary.

Figure 7:
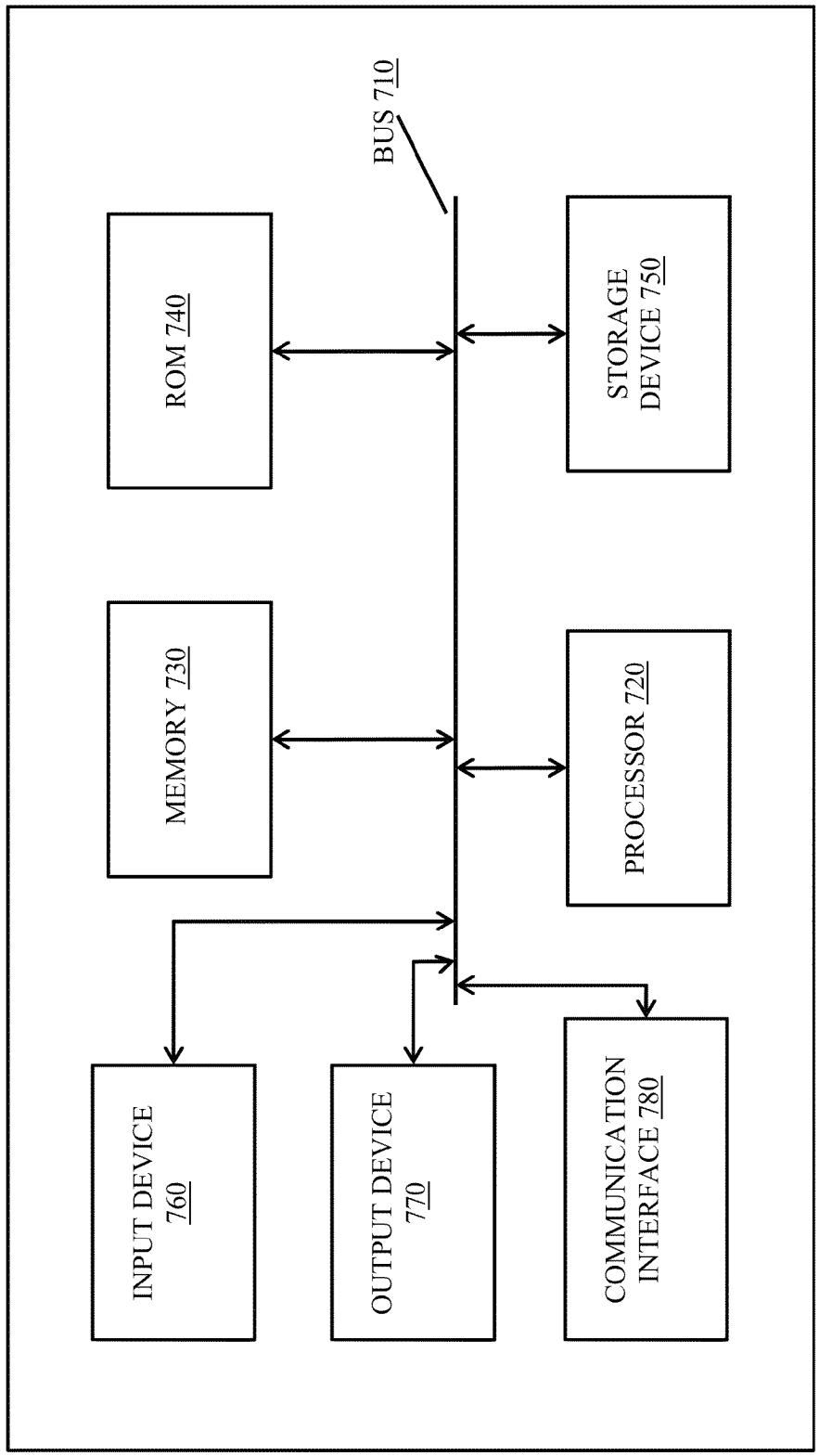
FIG. 7 depicts an exemplary architecture for implementing a computing device in accordance with one or more embodiments.

FIG. 7 depicts an exemplary architecture for implementing a computing device 700 in accordance with one or more embodiments, which may be used to implement any of the devices discussed herein, or any other computer system or computing device component thereof. It will be appreciated that other devices that can be used with the computing device 700, such as a client or a server, may be similarly configured. As illustrated in FIG. 7, computing device 700 may include a bus 710, a processor 720, a memory 730, a read only memory (ROM) 740, a storage device 750, an input device 760, an output device 770, and a communication interface 780.

Bus 710 may include one or more interconnects that permit communication among the components of computing device 700. Processor 720 may include any type of processor, microprocessor, or processing logic that may interpret and execute instructions (e.g., a field programmable gate array (FPGA)). Processor 720 may include a single device (e.g., a single core) and/or a group of devices (e.g., multi-core). Memory 730 may include a random access memory (RAM) or another type of dynamic storage device that may store information and instructions for execution by processor 720. Memory 730 may also be used to store temporary variables or other intermediate information during execution of instructions by processor 720.

ROM 740 may include a ROM device and/or another type of static storage device that may store static information and instructions for processor 720. Storage device 750 may include a magnetic disk and/or optical disk and its corresponding drive for storing information and/or instructions. Storage device 750 may include a single storage device or multiple storage devices, such as multiple storage devices operating in parallel. Moreover, storage device 750 may reside locally on the computing device 700 and/or may be remote with respect to a server and connected thereto via network and/or another type of connection, such as a dedicated link or channel.

Input device 760 may include any mechanism or combination of mechanisms that permit an operator to input information to computing device 700, such as a keyboard, a mouse, a touch sensitive display device, a microphone, a pen-based pointing device, and/or a biometric input device, such as a voice recognition device and/or a finger print scanning device. Output device 770 may include any mechanism or combination of mechanisms that outputs information to the operator, including a display, a printer, a speaker, etc.

Communication interface 780 may include any transceiver-like mechanism that enables computing device 700 to communicate with other devices and/or systems, such as a client, a server, a license manager, a vendor, etc. For example, communication interface 780 may include one or more interfaces, such as a first interface coupled to a network and/or a second interface coupled to a license manager. Alternatively, communication interface 780 may include other mechanisms (e.g., a wireless interface) for communicating via a network, such as a wireless network. In one implementation, communication interface 780 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 700 may perform certain functions in response to processor 720 executing software instructions contained in a computer-readable medium, such as memory 730. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Figure 8:
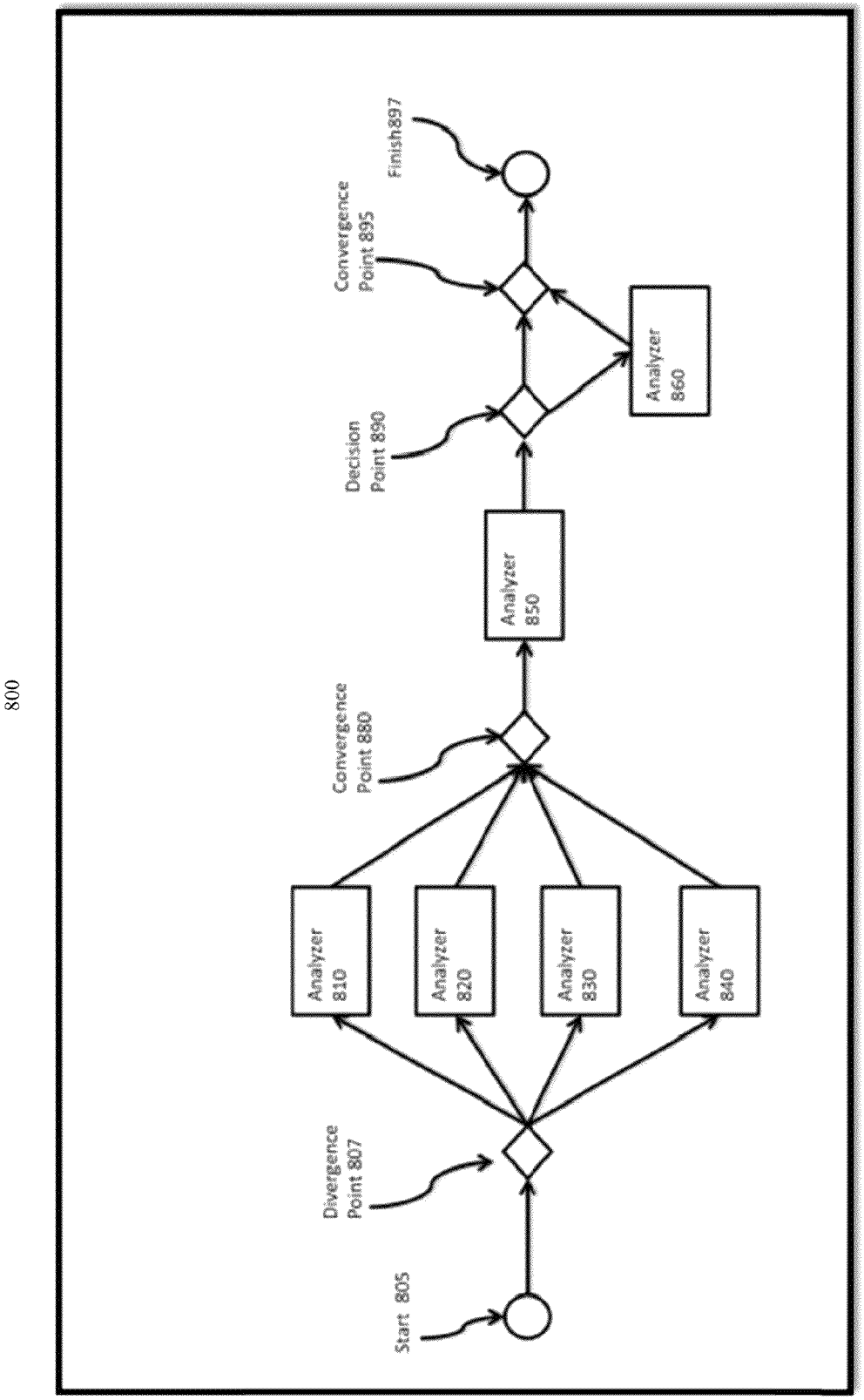
FIG. 8 is an exemplary embodiment of the invention depicting an example workflow where malware analyzers are run in a specified sequence.

Depicted in FIG. 8 is one embodiment of the invention where an exemplary workflow is depicted. Starting at start point 805 specifies that a workflow wherein analyzers 810, 820 830 and 840 are run simultaneously from Divergence point 807. The workflow then specifies that analyzer 850 is run after analyzers 810 through 840 are completed at convergence point 880. Decision point 890 specifies that Analyzer 860 is run if the results from analyzer 850 show that the sample is suspected to be malware. At convergence point 895, the analysis workflow is complete and the results of all the analyzers are gathered for presentation at finish 897.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present disclosure should not be limited by any of the above-described exemplary embodiments, but should instead be defined only in accordance with the following claims and their equivalents.

The invention claimed is:

1. A computer-implemented method executed by one or more processors, the method comprising:
   training a particular analyzer using machine learning to classify data samples as including malware or not including malware;
   providing data for generating a graphical user interface at a user device, the graphical user interface being configured to receive, through user selectable options, configuration data that (i) defines a user-defined workflow to control one or more analyzers for analyzing malware having a particular malware attribute and (ii) specifies whether one or more virtual machines are to be supported by the user-defined workflow;
   receiving, from the user device, the configuration data through the graphical user interface;
   storing the configuration data in a workflow definition database, the workflow definition database including workflow definitions for a plurality of workflows respectively associated with a plurality of malware attributes;
   receiving a sample including a potential malware;
   determining, by the one or more processors at a server, at least one malware attribute of the sample;
   determining that the at least one malware attribute of the sample includes the particular malware attribute;
   selecting, from the plurality of workflows, the user-defined workflow for analyzing the sample;
   causing, by the one or more processors at the server, one or more analyzers to analyze the sample according to the user-defined workflow to obtain an analysis result, the one or more analyzers including the particular analyzer that is trained using machine learning; and
   providing (I) the analysis result in a colloquial language format, and (II) data for generating a second graphical user interface at the user device, the second graphical user interface being configured to display, at the user device, the analysis result and an action control interface that receives a selection of one or more remedial actions based on the analysis result.

2. The computer-implemented method of claim 1, wherein the user-defined workflow designates an order in which to run each of the one or more analyzers.

3. The computer-implemented method of claim 2, wherein the order includes running at least two of the one or more analyzers concurrently.

4. The computer-implemented method of claim 1, further comprising providing a summary including at least one user-readable description of the analysis result to be displayed using the second graphical user interface.

5. The computer-implemented method of claim 4, wherein the summary includes a confidence level associated with the at least one user-readable description.

6. The computer-implemented method of claim 4, wherein the summary includes at least one recommendation for remediating malware in the sample.

7. The computer-implemented method of claim 1, further comprising:
   determining, by the one or more processors and based, at least in part, on the analysis result, a modified workflow for continued analysis of the sample by the one or more analyzers according to the modified workflow,
   wherein the modified workflow includes one or more of (i) designating one or more additional analyzers, (ii) altering an order in which to run each of the one or more analyzers, (iii) re-analyzing the analysis result by at least one of the one or more analyzers, and (iv) re-analyzing the analysis result by a particular analyzer that produced the analysis result.

8. The computer-implemented method of claim 7, further comprising receiving an indication of a user input,
   wherein determining the modified workflow for continued analysis of the sample by the one or more analyzers according to the modified workflow is based on the indication of the user input.

9. The computer-implemented method of claim 7, wherein the modified workflow is determined by applying at least one rule to the analysis result.

10. The computer-implemented method of claim 1, wherein the one or more remedial actions include (i) a removal action to remove malware associated with the sample, (ii) an alert action to alert a designated entity of the analysis result, and (iii) an analytics action to execute an additional analysis of the sample.

11. The computer-implemented method of claim 1, wherein the sample including the potential malware is received after storing the configuration data in the workflow definition database.

12. The computer-implemented method of claim 1, wherein the configuration data includes a selection of the one or more analyzers from among a plurality of analyzers and a chronological order of applying the one or more analyzers.

13. A system comprising:
one or more processors; and
a non-transitory computer-readable storage medium coupled to the one or more processors having instructions stored thereon which, when executed by the one or more processors, causes the one or more processors to perform operations comprising:
training a particular analyzer using machine learning to classify data samples as including malware or not including malware;
providing data for generating a graphical user interface at a user device, the graphical user interface being configured to receive, through user selectable options, configuration data that (i) defines a user-defined workflow to control one or more analyzers for analyzing malware having a particular malware attribute and (ii) specifies whether one or more virtual machines are to be supported by the user-defined workflow;
receiving, from the user device, the configuration data through the graphical user interface;
storing the configuration data in a workflow definition database, the workflow definition database including workflow definitions for a plurality of workflows respectively associated with a plurality of malware attributes;
receiving a sample including a potential malware;
determining, at a server, at least one malware attribute of the sample;
determining that the at least one malware attribute of the sample includes the particular malware attribute;
selecting, from the plurality of workflows, the user-defined workflow for analyzing the sample;
causing, at the server, one or more analyzers to analyze the sample according to the user-defined workflow to obtain an analysis result, the one or more analyzers including the particular analyzer that is trained using machine learning; and
providing (I) the analysis result in a colloquial language format and (II) data for generating a second graphical user interface at the user device, the second graphical user interface being configured to display, at the user device, the analysis result and an action control interface that receives a selection of one or more remedial actions based on the analysis result.

14. The system of claim 13, wherein the user-defined workflow designates an order in which to run each of the one or more analyzers.

15. The system of claim 14, wherein the order includes running at least two of the one or more analyzers concurrently.

16. The system of claim 13, further comprising providing a summary including at least one user-readable description of the analysis result to be displayed using the second graphical user interface.

17. The system of claim 16, wherein the summary includes a confidence level associated with the at least one user-readable description.

18. The system of claim 16, wherein the summary includes at least one recommendation for remediating malware in the sample.

19. The system of claim 13, wherein the one or more processors perform operations further comprising:
determining, based, at least in part, on the analysis result, a modified workflow for continued analysis of the sample by the one or more analyzers according to the modified workflow,
wherein the modified workflow includes one or more of (i) designating one or more additional analyzers, (ii) altering an order in which to run each of the one or more analyzers, (iii) re-analyzing the analysis result by at least one of the one or more analyzers, and (iv) re-analyzing the analysis result by a particular analyzer that produced the analysis result.

20. The system of claim 19, wherein the one or more processors perform operations further comprising receiving an indication of a user input,
wherein determining the modified workflow for continued analysis of the sample by the one or more analyzers according to the modified workflow is based on the indication of the user input.

21. The system of claim 19, wherein the modified workflow is determined by applying at least one rule to the analysis result.

22. The system of claim 13, wherein the one or more remedial actions include (i) a removal action to remove malware associated with the sample, (ii) an alert action to alert a designated entity of the analysis result, and (iii) an analytics action to execute an additional analysis of the sample.

23. The system of claim 13, wherein the sample including the potential malware is received after storing the configuration data in the workflow definition database.

24. The system of claim 13, wherein the configuration data includes a selection of the one or more analyzers from among a plurality of analyzers and a chronological order of applying the one or more analyzers.

25. A non-transitory computer-readable storage medium encoded with a computer program comprising instructions that, when executed, operate to cause one or more processors to perform operations comprising:
training a particular analyzer using machine learning to classify data samples as including malware or not including malware;
providing data for generating a graphical user interface at a user device, the graphical user interface being configured to receive, through user selectable options, configuration data that (i) defines a user-defined workflow to control one or more analyzers for analyzing malware having a particular malware attribute and (ii) specifies whether one or more virtual machines are to be supported by the user-defined workflow;
receiving, from the user device, the configuration data through the graphical user interface;
storing the configuration data in a workflow definition database, the workflow definition database including workflow definitions for a plurality of workflows respectively associated with a plurality of malware attributes;
receiving a sample including a potential malware;
determining, at a server, at least one malware attribute of the sample;
determining that the at least one malware attribute of the sample includes the particular malware attribute;
selecting, from the plurality of workflows, the user-defined workflow for analyzing the sample;
causing, at the server, one or more analyzers to analyze the sample according to the user-defined workflow to obtain an analysis result, the one or more analyzers including the particular analyzer that is trained using machine learning; and
providing (I) the analysis result in a colloquial language format and (II) data for generating a second graphical user interface at the user device, the second graphical user interface being configured to display, at the user device, the analysis result and an action control interface that receives a selection of one or more remedial actions based on the analysis result.

26. The non-transitory computer-readable storage medium of claim 25, wherein the user-defined workflow designates an order in which to run each of the one or more analyzers.

27. The non-transitory computer-readable storage medium of claim 26, wherein the order includes running at least two of the one or more analyzers concurrently.

28. The non-transitory computer-readable storage medium of claim 25, further comprising providing a summary including at least one user-readable description of the analysis result to be displayed using the second graphical user interface.

29. The non-transitory computer-readable storage medium of claim 28, wherein the summary includes a confidence level associated with the at least one user-readable description.

30. The non-transitory computer-readable storage medium of claim 28, wherein the summary includes at least one recommendation for remediating malware in the sample.

31. The non-transitory computer-readable storage medium of claim 25, wherein the one or more processors perform operations further comprising:
  determining, based, at least in part, on the analysis result, a modified workflow for continued analysis of the sample by the one or more analyzers according to the modified workflow,
  wherein the modified workflow includes one or more of (i) designating one or more additional analyzers, (ii) altering an order in which to run each of the one or more analyzers, (iii) re-analyzing the analysis result by at least one of the one or more analyzers, and (iv) re-analyzing the analysis result by a particular analyzer that produced the analysis result.

32. The non-transitory computer-readable storage medium of claim 31, wherein the one or more processors perform operations further comprising receiving an indication of a user input,
  wherein determining the modified workflow for continued analysis of the sample by the one or more analyzers according to the modified workflow is based on the indication of the user input.

33. The non-transitory computer-readable storage medium of claim 31, wherein the modified workflow is determined by applying at least one rule to the analysis result.

34. The non-transitory computer-readable storage medium of claim 25, wherein the one or more remedial actions include (i) a removal action to remove malware associated with the sample, (ii) an alert action to alert a designated entity of the analysis result, and (iii) an analytics action to execute an additional analysis of the sample.

35. The non-transitory computer-readable storage medium of claim 25, wherein the sample including the potential malware is received after storing the configuration data in the workflow definition database.

36. The non-transitory computer-readable storage medium of claim 25, wherein the configuration data includes a selection of the one or more analyzers from among a plurality of analyzers and a chronological order of applying the one or more analyzers.

* * * * *